US008829858B2

(12) United States Patent
Ransom et al.

(10) Patent No.: US 8,829,858 B2
(45) Date of Patent: Sep. 9, 2014

(54) SYSTEMS AND METHODS FOR INITIALIZING A CHARGING SYSTEM

(75) Inventors: Ray M. Ransom, Big Bear City, CA (US); Milun Perisic, Torrance, CA (US); Lateef A. Kajouke, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 13/149,484

(22) Filed: May 31, 2011

(65) Prior Publication Data

US 2012/0306454 A1 Dec. 6, 2012

(51) Int. Cl.
*H02J 7/00* (2006.01)
*H02J 7/04* (2006.01)

(52) U.S. Cl.
USPC ........... 320/138; 320/127; 320/128; 320/145; 320/152

(58) Field of Classification Search
CPC ...................................................... H02J 7/0055
USPC ...................................................... 320/138
See application file for complete search history.

(56) References Cited

U.S. PATENT DOCUMENTS

| | | | |
|---|---|---|---|
| 4,213,173 A | 7/1980 | Link et al. | |
| 4,669,036 A | 5/1987 | Cowett, Jr. | |
| 5,159,539 A | 10/1992 | Koyama | |
| 5,189,603 A | 2/1993 | Sashida et al. | |
| 5,274,538 A | 12/1993 | Sashida et al. | |
| 5,283,726 A | 2/1994 | Wilkerson | |
| 5,285,365 A | 2/1994 | Yamato et al. | |
| 5,418,707 A | 5/1995 | Shimer et al. | |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |
| 6,351,397 B1 | 2/2002 | Sawa et al. | |
| 6,496,343 B2 | 12/2002 | Mahlein et al. | |
| 6,538,909 B2 | 3/2003 | Goodarzi et al. | |

(Continued)

FOREIGN PATENT DOCUMENTS

| | | |
|---|---|---|
| CN | 2710247 Y | 7/2005 |
| CN | 1946587 A | 4/2007 |

(Continued)

OTHER PUBLICATIONS

Office Action, dated Oct. 24, 2012, for U.S. Appl. No. 12/941,552.

(Continued)

*Primary Examiner* — Edward Tso
*Assistant Examiner* — Ahmed Omar
(74) *Attorney, Agent, or Firm* — Ingrassia Fisher & Lorenz, P.C.

(57) ABSTRACT

Systems and methods are provided for initiating a charging system. The method, for example, may include, but is not limited to, providing, by the charging system, an incrementally increasing voltage to a battery up to a first predetermined threshold while the energy conversion module has a zero-percent duty cycle, providing, by the charging system, an incrementally increasing voltage to the battery from an initial voltage level of the battery up to a peak voltage of a voltage source while the energy conversion module has a zero-percent duty cycle, and providing, by the charging system, an incrementally increasing voltage to the battery by incrementally increasing the duty cycle of the energy conversion module.

20 Claims, 5 Drawing Sheets

(56) References Cited

U.S. PATENT DOCUMENTS

| | | | |
|---|---|---|---|
| 6,566,764 B2 | 5/2003 | Rebsdorf et al. |
| 6,583,519 B2 | 6/2003 | Aberle et al. |
| 6,614,132 B2 | 9/2003 | Hockney et al. |
| 6,989,613 B2 | 1/2006 | Andrews et al. |
| 6,998,732 B2 | 2/2006 | Xing et al. |
| 7,317,625 B2 | 1/2008 | Zhang et al. |
| 7,330,363 B2 | 2/2008 | Ponnaluri et al. |
| 7,483,282 B2 | 1/2009 | Kajouke et al. |
| 7,492,221 B2 | 2/2009 | Lawson et al. |
| 7,525,296 B2 | 4/2009 | Billig et al. |
| 7,558,087 B2 | 7/2009 | Meysenc et al. |
| 7,599,204 B2 | 10/2009 | Kajouke et al. |
| 7,679,941 B2 | 3/2010 | Raju et al. |
| 7,764,527 B2 | 7/2010 | Takayanagi |
| 8,063,606 B2 | 11/2011 | Veselic |
| 8,199,545 B2 | 6/2012 | Nguyen et al. |
| 8,288,887 B2 | 10/2012 | Ransom et al. |
| 8,614,901 B2 | 12/2013 | Victor et al. |
| 8,644,037 B2 | 2/2014 | Raju et al. |
| 2001/0012207 A1 | 8/2001 | Nomura |
| 2001/0026427 A1 | 10/2001 | Mahlein et al. |
| 2001/0036086 A1 | 11/2001 | Pascu et al. |
| 2002/0044468 A1 | 4/2002 | Goodarzi et al. |
| 2002/0109406 A1 | 8/2002 | Aberle et al. |
| 2002/0176261 A1 | 11/2002 | Norrga |
| 2003/0102718 A1 | 6/2003 | Hockney et al. |
| 2004/0026929 A1 | 2/2004 | Rebsdorf et al. |
| 2004/0041543 A1 | 3/2004 | Brooks et al. |
| 2004/0066663 A1 | 4/2004 | Raichle |
| 2004/0119449 A1 | 6/2004 | Matley |
| 2004/0252532 A1 | 12/2004 | Lee et al. |
| 2004/0257271 A1 | 12/2004 | Jacobson et al. |
| 2005/0206343 A1 | 9/2005 | Ichinose et al. |
| 2005/0270813 A1 | 12/2005 | Zhang et al. |
| 2006/0133120 A1 | 6/2006 | Sato et al. |
| 2006/0176028 A1 | 8/2006 | Schulte et al. |
| 2007/0035265 A1 | 2/2007 | Balog, Jr. et al. |
| 2007/0139975 A1 | 6/2007 | Yamauchi et al. |
| 2007/0274109 A1 | 11/2007 | Oyobe et al. |
| 2008/0013351 A1 | 1/2008 | Alexander |
| 2008/0055938 A1 | 3/2008 | Kajouke et al. |
| 2008/0055954 A1 | 3/2008 | Kajouke et al. |
| 2008/0122422 A1 | 5/2008 | Zhang et al. |
| 2008/0130339 A1 | 6/2008 | McDonald et al. |
| 2008/0198632 A1 | 8/2008 | Takayanagi |
| 2009/0033393 A1 | 2/2009 | Park et al. |
| 2009/0059633 A1 | 3/2009 | Hara et al. |
| 2009/0189456 A1 | 7/2009 | Skutt |
| 2009/0251938 A1 | 10/2009 | Hallak |
| 2009/0322287 A1 | 12/2009 | Ozeki et al. |
| 2010/0103703 A1 | 4/2010 | Nishiyama et al. |
| 2010/0128503 A1 | 5/2010 | Liu et al. |
| 2010/0244773 A1 | 9/2010 | Kajouke |
| 2010/0244775 A1 | 9/2010 | Smith |
| 2010/0259218 A1 | 10/2010 | Gale et al. |
| 2011/0031927 A1 | 2/2011 | Kajouke et al. |
| 2011/0031930 A1 | 2/2011 | Kajouke et al. |
| 2011/0032732 A1 | 2/2011 | Hsu |
| 2011/0080151 A1 | 4/2011 | Rahardjo et al. |
| 2011/0089928 A1 | 4/2011 | O'Gorman et al. |
| 2011/0227407 A1 | 9/2011 | Ransom |
| 2012/0014140 A1 | 1/2012 | Kajouke et al. |
| 2012/0112549 A1 | 5/2012 | Perisic et al. |
| 2012/0113683 A1 | 5/2012 | Perisic et al. |
| 2012/0113700 A1 | 5/2012 | Kajouke et al. |
| 2012/0268078 A1 | 10/2012 | Kajouke et al. |

FOREIGN PATENT DOCUMENTS

| | | |
|---|---|---|
| CN | 101022970 A | 8/2007 |
| CN | 101136594 A | 3/2008 |
| CN | 101136596 A | 3/2008 |
| CN | 101150281 A | 3/2008 |
| CN | 101166001 A | 4/2008 |
| CN | 101217255 A | 7/2008 |
| CN | 100410742 C | 8/2008 |
| CN | 101263648 A | 9/2008 |
| CN | 101465609 A | 6/2009 |
| CN | 101675580 A | 3/2010 |
| CN | 101847888 A | 9/2010 |
| CN | 101997323 A | 3/2011 |
| CN | 102029926 A | 4/2011 |
| DE | 102007040550 A1 | 3/2008 |
| GB | 2459542 A | 11/2009 |
| JP | 2008306855 A | 12/2008 |
| WO | 0191279 A1 | 11/2001 |

OTHER PUBLICATIONS

Office Action, dated Nov. 9, 2012, for U.S. Appl. No. 12/949,439.
Notice of Allowance, dated Nov. 15, 2012, for U.S. Appl. No. 12/725,265.
Notice of Allowance, dated Nov. 16, 2012, for U.S. Appl. No. 12/535,975.
USPTO, Office Action in U.S. Appl. No. 12/941,488, mailed Mar. 20, 2013.
USPTO, Notice of Allowance and Fee(s) Due for U.S. Appl. No. 12/941,552, mailed Feb. 20, 2013.
USPTO, Notice of Allowance and Fee(s) Due for U.S. Appl. No. 12/535,994, mailed Sep. 7, 2012.
USPTO, Notice of Allowance and Fee(s) Due for U.S. Appl. No. 12/949,439, mailed Mar. 25, 2013.
CPO, Chinese Office Action, for Chinese Application No. 201010247400.4, mailed Jan. 23, 2013.
CPO, Chinese Office Action, for Chinese Application No. 201010556242.0, mailed Feb. 1, 2013.
USPTO "Notice of Allowance" mailed Jan. 25, 2013; U.S. Appl. No. 12/839,134, filed Jul. 19, 2010.
German Office Action, dated Mar. 21, 2012, for German Patent Application No. 10 2011 085 063.5.
Chu, Grace, et al., "A Unified Approach for the Derivation of Robust Control for Boost PFC Converters," IEEE Transactions on Power Electronics, Nov. 2009, pp. 2531-2544, vol. 24, Issue: 11.
Office Action, dated Oct. 5, 2011, for U.S. Appl. No. 12/413,181.
U.S. Office Action, dated Nov. 25, 2011, for U.S. Appl. No. 12/622,088.
U.S. Office Action, dated Jan. 23, 2012, for U.S. Appl. No. 12/535,994.
Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.
Prathapan, P.T., et al., "Feedforward Current Control of Boost-Derived Single-phase PFC Converters," IEEE Applied Power Electronics Conference and Exposition, Mar. 2005, pp. 1716-1722, vol. 3.
Ransom R.M., et al. "Systems and Methods for Commutating Inductor Current Using a Matrix Converter," U.S. Appl. No. 12/622,088, filed Nov. 19, 2009.
Ransom, R.M., "Systems and Methods for Deactivating a Matrix Converter," U.S. Appl. No. 12/725,265, filed Mar. 16, 2010.
Kajouke, L.A., et al., "Systems and Methods for Reducing Transient Voltage Spikes in Matrix Converters," U.S. Appl. No. 12/839,134, filed Jul. 19, 2010.
Perisic, M., et al. "Compensation for Electrical Converter Nonlinearities," U.S. Appl. No. 12/941,552, filed Nov. 8, 2010.
Perisic, M., et al. "Systems and Methods for Providing Power to a Load Based Upon a Control Strategy," U.S. Appl. No. 12/949,439, filed Nov. 18, 2010.
German Office Action, dated Jan. 27, 2012, for German Patent Application No. 10 2010 031 615.6.
Perisic, M., et al. "Compensation for Electrical Converter Nonlinearities," U.S. Appl. No. 12/941,521, filed Nov. 8, 2010.
Kajouke, L.A., et al. "Systems and Methods for Reducing Harmonic Distortion in Electrical Converters," U.S. Appl. No. 12/941,488, filed Nov. 8, 2010.
Delorme, Gilles M., et al. "Methods and Systems for Controlling Vehicle Defrost Units," U.S. Appl. No. 12/871,664, filed Aug. 30, 2010.

(56) References Cited

OTHER PUBLICATIONS

Kajouke, L.A., et al. "Discharging a DC Bus Capacitor of an Electrical Converter System," U.S. Appl. No. 13/090,911, filed Apr. 20, 2011.
Perisic, M., et al. "Systems and Methods for Providing Power to a Load Based Upon a Control Strategy," U.S. Appl. No. 13/222,961, filed Aug. 31, 2011.
U.S. Office Action, dated Feb. 8, 2012, for U.S. Appl. No. 12/535,975.
Office Action, dated Jul. 23, 2012, for U.S. Appl. No. 12/725,265.
Final Office Action, dated Aug. 2, 2012, for U.S. Appl. No. 12/535,975.
Office Action, dated Aug. 29, 2012, for U.S. Appl. No. 12/839,134.
USPTO, U.S. "Final Office Action" mailed Jun. 28, 2012, for U.S. Appl. No. 12/535,994, filed Aug. 5, 2008.
USPTO, U.S. "Final Office Action" mailed May 10, 2012, for U.S. Appl. No. 12/413,181, filed Mar. 27, 2009.
USPTO, U.S. "Notice of Allowance" mailed Jun. 11, 2012, for U.S. Appl. No. 12/622,088, filed Nov. 19, 2009.
USPTO, Notice of Allowance and Fee(s) Due for U.S. Appl. No. 12/941,521, mailed Jul. 19, 2013.
USPTO, Notice of Allowance and Fee(s) Due for U.S. Appl. No. 12/941,488, mailed Jul. 31, 2013.
USPTO, Office Action for U.S. Appl. No. 12/413,181, mailed Aug. 15, 2013.
USPTO, Notice of Allowance and Fee(s) Due for U.S. Appl. No. 13/222,961, mailed Sep. 18, 2013.
State Intellectual Property Office of the People's Republic of China, Office Action for Chinese Patent Application No. 201110349804.9, mailed Dec. 4, 2013.
State Intellectual Property Office of the People's Republic of China, Office Action for Chinese Patent Application No. 201110349847.7, mailed Dec. 23, 2013.
State Intellectual Property Office of the People's Republic of China, Office Action for Chinese Patent Application No. 201110349850.9, mailed Dec. 25, 2013.
State Intellectual Property Office of the People's Republic of China, Office Action for Chinese Patent Application No. 201210175351.7, mailed Mar. 10, 2014.
State Intellectual Property Office of the People's Republic of China, Office Action for Chinese Patent Application No. 201210117250.4, mailed Mar. 28, 2014.
USPTO, Final Office Action for U.S. Appl. No. 12/413,181, mailed Mar. 13, 2014.
USPTO, Notice of Allowance and Fee(s) Due for U.S. Appl. No. 13/090,911, mailed Jun. 12, 2014.
USPTO, Notice of Allowance and Fee(s) Due for U.S. Appl. No. 13/222,961, mailed Jul. 8, 2014.

SYSTEMS AND METHODS FOR INITIALIZING A CHARGING SYSTEM

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to a control strategy initiating an energy delivery system.

BACKGROUND

Plug-in Hybrid and fully electric vehicles have become increasingly popular in recent years. These vehicles typically have large battery systems which can take many hours to charge while consuming large amounts of power. Current charging systems for the battery systems are configured to be plugged in to a residential or commercial power grid. However, when the charging system is first connected, large voltage spikes can be created which could potentially damage the charging system and the battery system.

BRIEF SUMMARY

In accordance with one embodiment, a method for initiating a charging system having an energy conversion module configured to provide a boost function based upon a duty cycle, is provided. The method may include, but is not limited to, providing, by the charging system, an incrementally increasing voltage to a battery up to a first predetermined threshold while the energy conversion module has a zero-percent duty cycle, providing, by the charging system, an incrementally increasing voltage to the battery from an initial voltage level of the battery up to a peak voltage of a voltage source while the energy conversion module has a zero-percent duty cycle, and providing, by the charging system, an incrementally increasing voltage to the battery by incrementally increasing the duty cycle of the energy conversion module.

In accordance with another embodiment, a charging system is provided. The charging system may include, but is not limited to n first interface configured to receive a voltage source, an energy conversion module electrically connected to the interface, and a controller communicatively connected to the energy conversion module. The controller can be configured to control the energy conversion module to provide an incrementally increasing voltage to a battery up to a first predetermined threshold while the energy conversion module has a zero-percent duty cycle, provide an incrementally increasing voltage to the battery from an initial voltage level of the battery up to a peak voltage of a voltage source while the energy conversion module has a zero-percent duty cycle, and provide an incrementally increasing voltage to the battery by incrementally increasing the duty cycle of the energy conversion module.

In accordance with yet another embodiment, a method for initiating a charging system having an energy conversion module electrically connected to an alternating current (AC) interface, is provided. The method may include, but is not limited to synchronizing, by a control module, the charging system to an AC voltage source connected to the AC interface, determining, by the control module, a next zero crossing of the AC voltage source, calculating, by the control module, a start time for each half cycle of the AC source to initiate a pulse width modulated (PWM) control signal, the control signal configured to cause the energy conversion module to transfer a voltage to a battery, and generating, by the control module, the PWM control signal from the start time to an approximate end of a half cycle of the AC voltage source.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Figure 1:
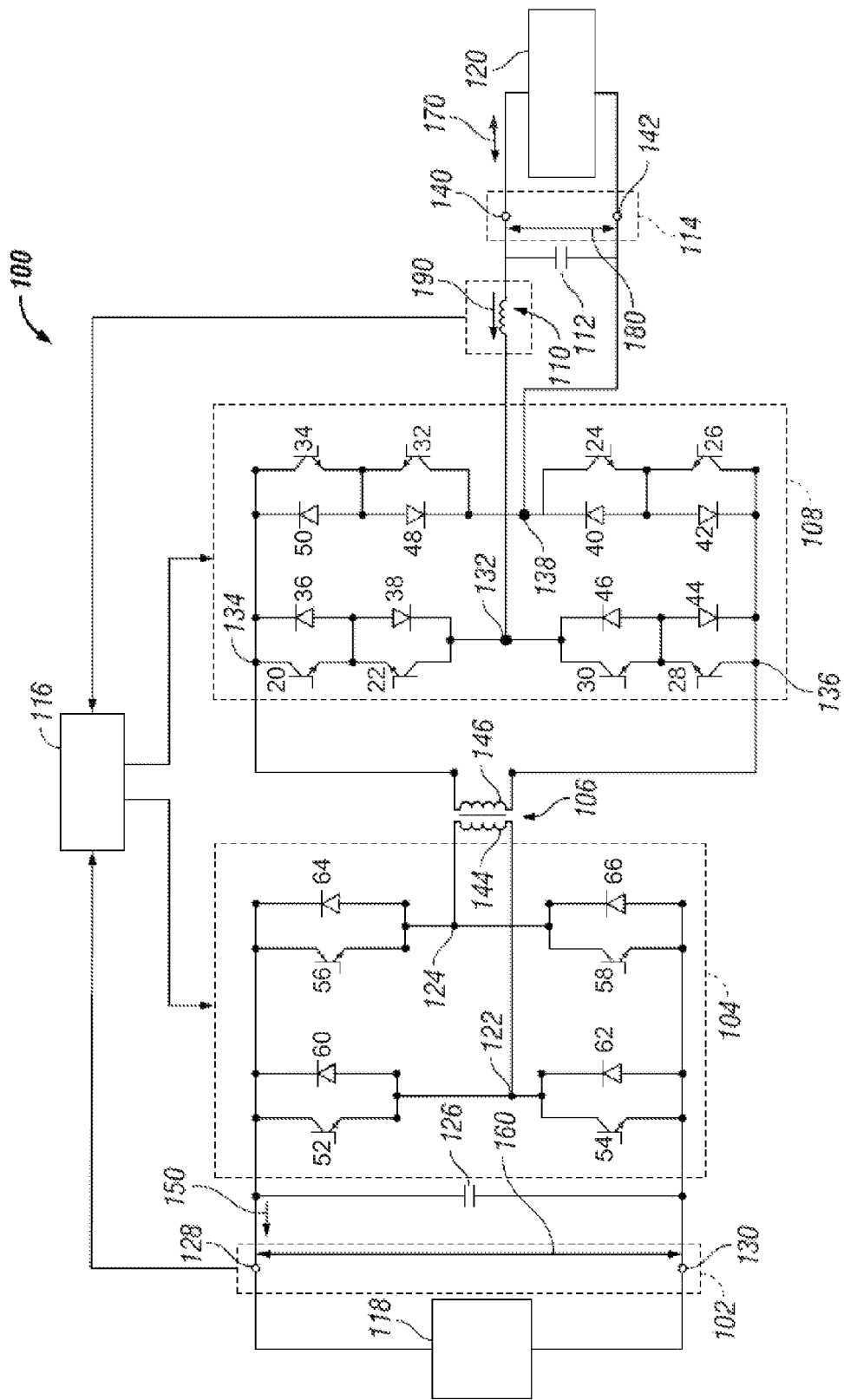
FIG. 1 is a schematic diagram of an electrical system suitable for use in a vehicle in accordance with one embodiment.

FIG. 1 depicts an exemplary embodiment of an electrical system 100 (or alternatively, a charging system, charger or charging module) suitable for use in a vehicle, such as, for example, an electric and/or hybrid vehicle. While the description below relates to a charging system for an electric and/or hybrid vehicle, one of ordinary skill in the art would recognize that other electrical systems could be created or modified to take advantage of the features discussed herein.

The electrical system 100 includes, without limitation, a first interface 102, a first energy conversion module 104, an isolation module 106, a second energy conversion module 108, an inductive element 110, a capacitive element 112, a second interface 114, and a control module 116. The first interface 102 generally represents the physical interface (e.g., terminals, connectors, and the like) for coupling the electrical system 100 to a DC energy source 118 and the second interface 114 generally represents the physical interface (e.g., terminals, connectors, and the like) for coupling the electrical system 100 to an alternating current (AC) energy source 120. Accordingly, for convenience, the first interface 102 may be referred to herein as the DC interface and the second interface 114 may be referred to herein as the AC interface. In an exemplary embodiment, the control module 116 is coupled to the conversion modules 104, 108 and operates the conversion modules 104, 108 to achieve a desired power flow from the AC energy source 120 to the DC energy source 118, as described in greater detail below.

In an exemplary embodiment, the DC energy source 118 (or alternatively, the energy storage source or ESS) is capable of receiving a direct current ($i_{DC}$) (indicated by arrow 150) from the electrical system 100 at a particular DC voltage level ($V_{DC}$) (indicated by arrow 160). In accordance with one embodiment, the DC energy source 118 is realized as a rechargeable high-voltage battery pack having a nominal DC voltage range from about two hundred to about five hundred Volts DC. In this regard, the DC energy source 118 may comprise the primary energy source for another electrical system and/or an electric motor in a vehicle. For example, the DC energy source 118 may be coupled to a power inverter that is configured to provide voltage and/or current to the electric motor, which, in turn, may engage a transmission to drive the vehicle in a conventional manner. In other embodiments, the DC energy source 118 may be realized as a battery, a fuel cell, an ultracapacitor, or another suitable energy storage element.

The AC energy source 120 (or power source) is configured to provide an AC current ($i_{AC}$) (indicated by arrow 170) to the charging system 100 at a particular AC voltage level ($V_{AC}$) (indicated by arrow 180) and may be realized as a main power supply or main electrical system for a building, residence, or another structure within an electric power grid (e.g., mains electricity or grid power). In accordance with one embodiment, the AC energy source 120 comprises a single-phase power supply, as is common to most residential structures, which varies depending on the geographic region. For example, in the United States, the AC energy source 120 may be realized as 220 Volts (RMS) or 240 Volts (RMS) at 60 Hz, while in other regions the AC energy source 120 may be realized as two-hundred ten Volts (RMS) or two-hundred twenty volts (RMS) at fifty Hz. In alternative embodiments, the AC energy source 120 may be realized as any AC energy source suitable for operation with the charging system 100.

As described in greater detail below, the DC interface 102 is coupled to the first conversion module 104 and the AC interface 114 is coupled to the second conversion module 108 via the inductive element 110. The isolation module 106 is coupled between the conversion modules 104, 108 and provides galvanic isolation between the two conversion modules 104, 108. The control module 116 is coupled to the conversion modules 104 and 108 and operates the second conversion module 108 to convert energy from the AC energy source 120 to high-frequency energy across the isolation module 106 which is then converted to DC energy at the DC interface 102 by the conversion module 104. It should be understood that although the subject matter may be described herein in the context of a grid-to-vehicle application (e.g., the AC energy source 120 delivering energy to the DC energy source 118) for purposes of explanation, in other embodiments, the subject matter described herein may be implemented and/or utilized in vehicle-to-grid applications (e.g., the DC energy source 118 delivering energy to the AC interface 114 and/or AC energy source 120).

In order to charge the DC energy source 118, the first conversion module 104 converts high-frequency energy at nodes 122 and 124 to DC energy that is provided to the DC energy source 118 at the DC interface 102. In this regard, the first conversion module 104 operates as a rectifier when converting high frequency AC energy to DC energy. In the illustrated embodiment, the first conversion module 104 comprises four switching elements (52, 54, 56 and 58) with each switching element having a diode (60, 62, 64 and 68) configured antiparallel to the respective switching element to accommodate bidirectional energy delivery. As shown, a capacitor 126 is configured electrically in parallel across the DC interface 102 to reduce voltage ripple at the DC interface 102, as will be appreciated in the art.

In an exemplary embodiment, the switching elements (52, 54, 56 and 58) are transistors, and may be realized using any suitable semiconductor transistor switch, such as an insulated gate bipolar transistor, a metal-oxide semiconductor field effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off. As described in greater detail below, in an exemplary embodiment, the control module 116 operates the switches of the first conversion module 104 to provide a path for current from the DC energy source 118 to the isolation module 106 to provide an injection current at nodes 134, 136 of the second conversion module 108.

In the illustrated embodiment, switch 52 is connected between node 128 of the DC interface 102 and node 122 and configured to provide a path for current flow from node 128 to node 122 when switch 52 is closed. Diode 60 is connected between node 122 and node 128 and configured to provide a path for current flow from node 122 to node 128 (e.g., diode 60 is antiparallel to switch 52). Switch 54 is connected between node 130 of the DC interface 102 and node 122 and configured to provide a path for current flow from node 122 to node 130 when switch 54 is closed, while diode 62 is connected between node 122 and node 130 and configured to provide a path for current flow from node 130 to node 122. In a similar manner, switch 56 is connected between node 128 and node 124 and configured to provide a path for current flow from node 128 to node 124 when switch 56 is closed, diode 64 is connected between node 124 and the DC interface 102 and configured to provide a path for current flow from node 124 to node 128, switch 58 is connected between node 130 and node 124 and configured to provide a path for current flow from node 124 to node 130 when switch 58 is closed, and diode 66 is connected between node 124 and the DC interface 102 and configured to provide a path for current flow from the node 130 to node 124.

In an exemplary embodiment, the second conversion module 108 facilitates the flow of current (or energy) from the AC energy source 120 and/or inductive element 110 to the isolation module 106. In the illustrated embodiment, the second conversion module 108 is realized as a front end single-phase matrix converter comprising eight switching elements (20, 22, 24, 26, 28, 30, 32 and 34) with each switching element having a diode (36, 38, 40, 42, 44, 46, 48 and 50) configured antiparallel to the respective switching element, in a similar manner as set forth above in regards to the first conversion module 104. For convenience, but without limitation, the second conversion module 108 may alternatively be referred to herein as a matrix conversion module (or matrix converter) or a cycloconverter. As described in greater detail below, the control module 116 modulates (e.g., opens and/or closes) the switches (20, 22, 24, 26, 28, 30, 32 and 34) of the matrix converter 108 to produce a high-frequency voltage at nodes 122, 124 that achieves a desired power flow to the DC interface 102 and/or DC energy source 118.

In the illustrated embodiment of FIG. 1, a first pair of switches (20 and 22) and diodes (36 and 38) are coupled between node 132 and node 134, with the first pair of switch and antiparallel diode (e.g., 20 and 36) being configured with opposite polarity as the second pair of switch and antiparallel diode (e.g., 22 and 38). In this manner, switch 20 and diode 38 are configured to provide a path for current flow from node 134 through switch 20 and diode 38 to node 132 when switch 20 is closed, turned on, or otherwise activated and the voltage at node 134 is more positive than the voltage at node 132. Switch 22 and diode 36 are configured to provide a path for current flow from node 132 through switch 22 and diode 36 to node 134 when switch 22 is closed, turned on, or otherwise activated and the voltage at node 132 is more positive than the voltage at node 134. In a similar manner, a second pair of switches (24 and 26) and diodes (40 and 42) are coupled between node 136 and node 138, a third pair of switches (28 and 30) and diodes (44 and 46) are coupled between node 132 and node 136, a fourth pair of switches (32 and 34) and diodes (48 and 50) are coupled between node 134 and node 138.

In the illustrated embodiment, switches 20, 24, 28, and 32 comprise a first set of switches which are capable of commutating the current through the inductive element 110 ($i_L$) (indicated by arrow 190) from node 132 to node 138 when the current through the inductive element 110 is flowing in a negative direction (e.g., $i_L<0$) and switches 22, 26, 30, and 34 comprise a second set of switches that are capable of commutating the current through the inductive element 110 from node 138 to node 132 when the current through the inductive element 110 is flowing in a positive direction (e.g., $i_L>0$), as described in greater detail below. In other words, switches 20, 24, 28 and 32 are capable of conducting at least a portion of current flowing in a negative direction through the inductive element 110 (e.g., $i_L<0$) and switches 22, 26, 30 and 34 are capable of conducting at least a portion of current flowing in a positive direction through the inductive element 110 (e.g., $i_L>0$). As used herein, commutating should be understood as the process of cycling the current through the inductive element 110 through switches and diodes of the matrix converter 108 such that the flow of current through the inductive element 110 is not interrupted.

In an exemplary embodiment, the isolation module 106 comprises a first set of windings 144 connected between nodes 122 and 124 of the first conversion module 104 and a second set of windings 146 connected between nodes 134 and 136. For purposes of explanation, the windings 146 may be referred to herein as comprising the primary winding stage (or primary windings) and the sets of windings 144 may be referred to herein as comprising the secondary winding stage (or secondary windings). The windings 144 and 146 provide inductive elements that are magnetically coupled in a conventional manner to form a transformer, as will be appreciated in the art. In an exemplary embodiment, the isolation module 106 is realized as a high-frequency transformer. In this regard, the isolation module 106 comprises a transformer designed for a particular power level at a high-frequency, such as the switching frequency of the switches of the conversion modules 104 and 108 (e.g., 50 kHz), resulting in the physical size of the transformer being reduced relative to a transformer designed for the same power level at a lower frequency, such as the frequency of the AC energy source 120 (e.g., the mains frequency).

In an exemplary embodiment, the inductive element 110 is realized as an inductor configured electrically in series between node 132 of the matrix converter 108 and a node 140 of the AC interface 114. Accordingly, for convenience, but without limitation, the inductive element 110 is referred to herein as an inductor. The inductor 110 functions as a high-frequency inductive energy storage element during operation of the electrical system 100. The capacitive element 112 is realized as a capacitor coupled between node 140 and node 142 of the AC interface 114, and the capacitor 112 and inductor 110 are cooperatively configured to provide a high frequency filter to minimize voltage ripple at the AC interface 114, as will be appreciated in the art.

The control module 116 generally represents the hardware, firmware and/or software configured to operate and/or modulate the switches of the conversion modules 104 and 108 to achieve a desired power flow from the AC energy source 120 to the DC energy source 118. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During normal operation, after the start-up period, for grid-to-vehicle applications, the control module 116 determines pulse-width modulated (PWM) command signals that control the timing and duty cycles of the switches (20-34) of the matrix converter 108 to produce a high-frequency AC voltage across the primary windings 146 of the isolation module 106 which induces a voltage across the secondary windings 144 at nodes 122 and 124 that results in a desired current ($i_{DC}$) flowing to the DC interface 102 to charge the DC energy source 118. For example, in accordance with one embodiment, the control module 116 generates a sinusoidal PWM variable duty cycle control signal that controls state machine transitions, and thereby, the duty cycle of the switches (20-34) to implement the appropriate switching pattern during a switching interval (e.g., the inverse of the switching frequency). The control module 116 obtains, monitors, or otherwise samples voltage at the DC interface 102 ($V_{DC}$) and compares the obtained DC voltage with a reference voltage (e.g., the desired voltage the DC interface 102) to obtain an error signal that is compared with high frequency carrier signal that corresponds to the switching frequency (e.g., 50 kHz) to obtain the sinusoidal PWM modulated duty cycle. When the error signal is less than the carrier signal, the control module 116 operates the switches 20-34 to effectively short-circuit nodes 132 and 138 and cycle energy through the matrix converter 108 to apply a voltage across the inductor 110. When the error signal is greater than the carrier signal, the control module 116 operates the switches (20-34) to release the stored energy and/or voltage of the inductor 110 (alternatively, the fly-back voltage). The sum of the fly-back voltage and the voltage at the AC interface 114 is applied to the primary windings 146 of the isolation module 106, resulting in a power transfer to nodes 122 and 124 and/or DC energy source 118. The control module 116 repeats the steps of operating the switches (20-34) to cycle energy through the matrix converter 108 when the error signal becomes less than the carrier signal and releasing the stored energy of the inductor 110 when the error signal is greater than the carrier signal. In this manner, the matrix converter 108 alternates between cycling energy through the inductor 110 and delivering energy to the isolation module 106 and/or DC interface 102 as needed throughout operation of the charging system 100.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of a matrix converter 108 for a vehicle, the subject matter is not intended to be limited to vehicular and/or automotive applications, and the subject matter described herein may be implemented in any application where an energy conversion module (e.g., buck converters, boost converters, power inverters, current source inverters and/or converters, voltage source inverters and/or converters, and the like) is utilized to transfer energy using switching elements.

Figure 2:
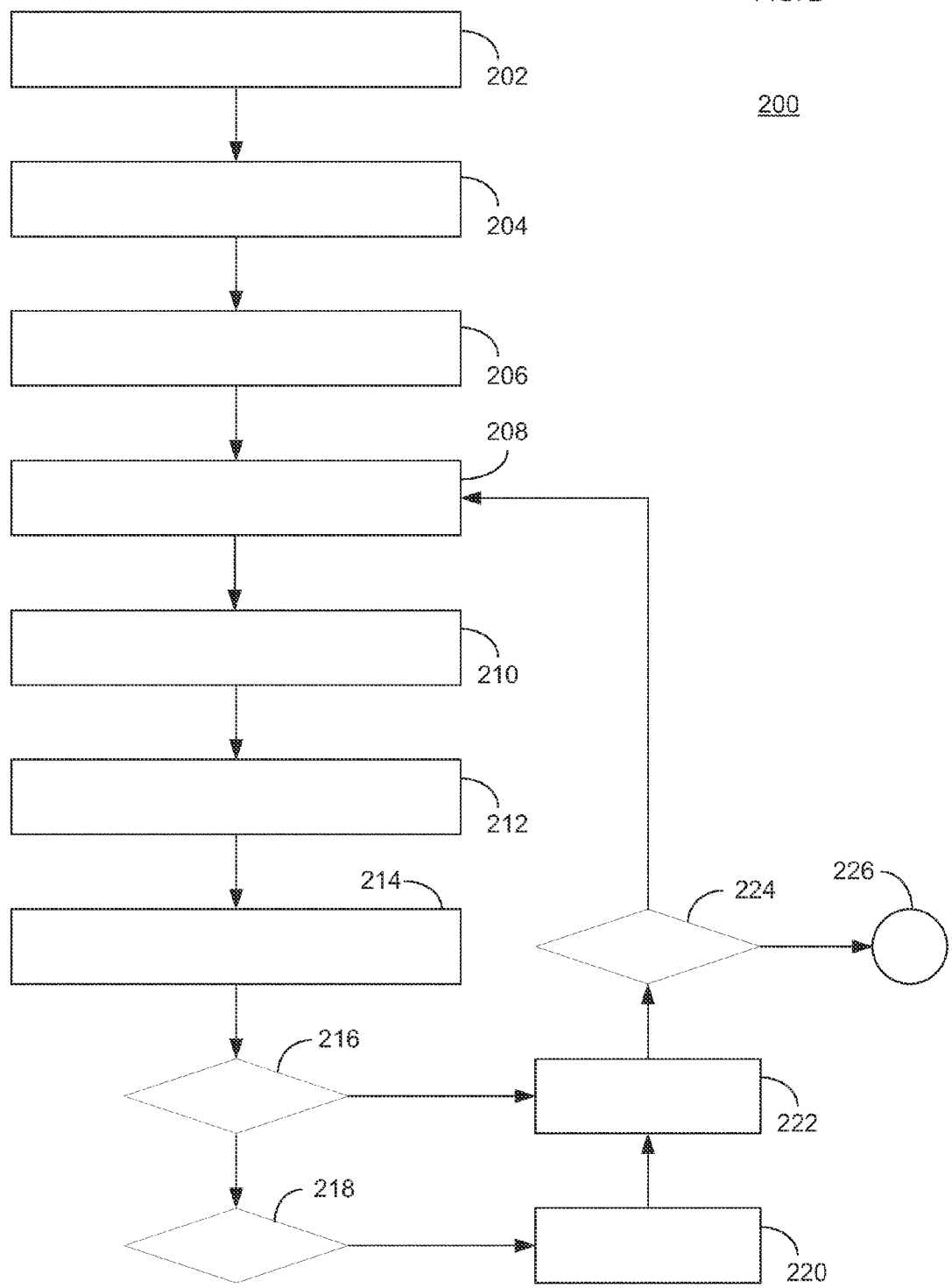
FIG. 2 is a flow diagram illustrating a first phase for initiating an electrical system, in accordance with one embodiment.

FIG. 2 is a flow diagram 200 for an exemplary initial start-up phase for the electrical system 100 illustrated in FIG. 1. The initial start-up phase, as well as the subsequent start-up phases discussed below, can be controlled, for example, by control module 116. The initial start-up phase begins by synchronizing to the electrical system 100 to the AC energy source 120. (Step 202). As discussed in further detail below, during the start-up phase the control module 116 issues PMW control signals based upon a zero crossing of the AC energy source 120. In one embodiment, for example, the control module 116 includes a phase lock loop (PLL) to synchronize the electrical system 100 to the AC energy source 120. In other embodiments, the control module may utilize hardware, software or any combination thereof to determine zero-crossings of the AC energy source 120.

The control module then initializes an initial start-up cycle. (Step 204). In order to safely start the electric system 100 to charge the capacitor 126 and/or the DC energy source 118, the control module 116 uses the PMW signals to control switches 20-34 and 52-58 to slowly build a charge across capacitor 126 and/or DC voltage source 118. As discussed above, the sum of the fly-back voltage and the voltage at the AC interface 114 is applied to the primary windings 146 of the isolation module 106, resulting in a power transfer to nodes 122 and 124 and/or the DC energy source 118. The electrical system 100, during the initial start-up phase, is configured to have a zero-percent duty cycle such that the fly-back voltage is zero volts (i.e., there is no voltage boost). For example, in an exemplary half cycle the electrical system 100, when providing a zero-percent duty cycle, will open switches 20, 24, 30 and 34 while simultaneously closing switches 22, 26, 28 and 32. In a subsequent half cycle, switches 22, 26, 28 and 32 would be opened while switches 20, 24, 30 and 34 would be closed. When providing a boost, the control module 116 will open all of the switches 20-34 for a predetermined time, based upon a desired duty cycle, as discussed in further detail below.

The initialization in Step 204 can vary depending, for example, upon the configuration of the electrical system and the rate at which the voltage increases such that the electrical system 100 can safely be start-up. The control module 116 may create or initialize a start-up counter to control a control loop (Steps 206-226 discussed in further detail below) and determine a voltage increment amount to increase the voltage by every complete cycle through the control loop and to be transferred to the capacitor 126 and/or DC voltage source 118. The control module 116 determines a maximum voltage for the start-up phase and/or a corresponding maximum counter value. In one embodiment, for example, the voltage increment may be one volt, the maximum voltage may be twenty volts and the corresponding maximum counter value would be twenty. In another embodiment, for example, the voltage increment may be a tenth of a volt, the maximum voltage may be twenty volts and the corresponding maximum counter value would be two-hundred. However, the voltage increment and maximum voltage can vary depending upon the configuration of the electrical system 100, the voltage of the DC voltage source 118 and the voltage of the AC interface 114. In another embodiment, for example, the maximum value for the counter in the first phase may correspond to a peak voltage of the AC source 120.

The control module 116 then waits for the next zero crossing. (Step 206). The control module 116 then calculates when the next zero crossing will occur. (Step 208). As discussed above, the AC interface 114 may be attached to an AC power source. In the United States, for example, the standard AC power source operates at 60 hertz. Accordingly, in one embodiment, for example, zero crossings of the AC interface may occur approximately every 8.3333 ms; however other frequencies may be used.

The control module 116 then computes a start time for the PWM signal to start the PWM signals prior to the next calculated zero crossing. (Step 210). In other words, in the start-up phase PWM signals are generated only at the tail end of each AC half cycle. At the end of each AC half cycle the line voltage from the AC interface 114 is low and approaching zero. Accordingly, any current flowing into inductor 110 from the AC interface 114 will be tapering down to zero. Since the current through the inductor 110 is tapering down to zero as the PWM signals are ending, there is no excess current in the electrical system 100 which has to be accounted for. In one embodiment, for example, the control module 116 calculates the start time based upon the following equation:

$$StartTime(x) = ZeroCross(x+1) - \arcsin\left(\frac{ControlVoltage(x)}{ACPeakVoltage}\right)$$

Where the ZeroCross(x+1) is the next calculated zero crossing from Step 208 and a control voltage ControlVoltage (x) is the multiplication of the current start-up counter value and the voltage increment amount determined in Step 204. While the exemplary flow diagram illustrates the control module calculating the next start time in real time as the electrical system 100 is initialized, the start times can be calculated at any time. In another embodiment, for example, the control module 116 may calculate the start-up times in advance.

The control module 116 then waits for the calculated start-up time. (Step 212). At the calculated start-up time, the control module 116 starts the PWM signals with a zero percent duty cycle. (Step 214). As discussed above, the control module 116 issues the PWM signals with a zero percent duty cycle, which provide no boost function, in the initial and secondary phases. As discussed in further detail below, the switches 20-34 can be configured to provide a flyback voltage from the inductor 110 through the isolation module 106 to the capacitor 126 and/or DC voltage source 118. The boost function allows the electrical system 100 to provide a voltage higher than the peak voltage of the AC interface 114 to charge the capacitor 126 and/or DC voltage source 118. In one embodiment, for example, the DC voltage source is a rechargeable battery in an electric or hybrid vehicle. In this embodiment the rechargeable battery may have a peak voltage of three-hundred volts. In contrast, the AC source 120 may be a standard U.S. power outlet in a home, providing a peak voltage of one-hundred seventy volts.

Once the PWM signals have begun, the control module 116 monitors the amount of current 190 flowing through inductor 110. If the current is above a predetermined threshold, the control module stops the PWM signals. (Step 222). The predetermined threshold may be fixed, for example, based upon a threshold where damage could occur to the electrical system 100. In one embodiment, for example, the predetermined threshold is ten amps. In other embodiments, the predetermined threshold may vary, for example, based upon the present control voltage.

If the current 190 through inductor 110 is not above the predetermined threshold, the control module then determines if a PWM off time has been reached. (Step 218). In one embodiment, for example, the PWM off time may be the zero crossing time calculated in Step 208. If the PWM off time has not been reached, the control module 116 returns to Step 216 and continues to monitor the current 190 through inductor 110. If the PWM off time has been reached, the control module 116 increments the start-up counter. (Step 220). The control module then ceases the PWM signals. (Step 222). In one embodiment, for example, the control module 116 may cease the PWM signals at the zero crossing point. In another embodiment, the control module 116 may cease the PWM signals at the current zero-crossing point or some other predetermined point after the zero crossing.

The control module 116 then determines if the start-up counter has reached its end value, signaling the end of the initial start-up phase. (Step 224). If the start-up counter is less than the end value, the control module returns to Step 208 to determine when the next zero crossing will occur. If the counter is equal to the end value, the control module proceeds to the second phase, discussed in further detail below. (Step 226).

Figure 3:
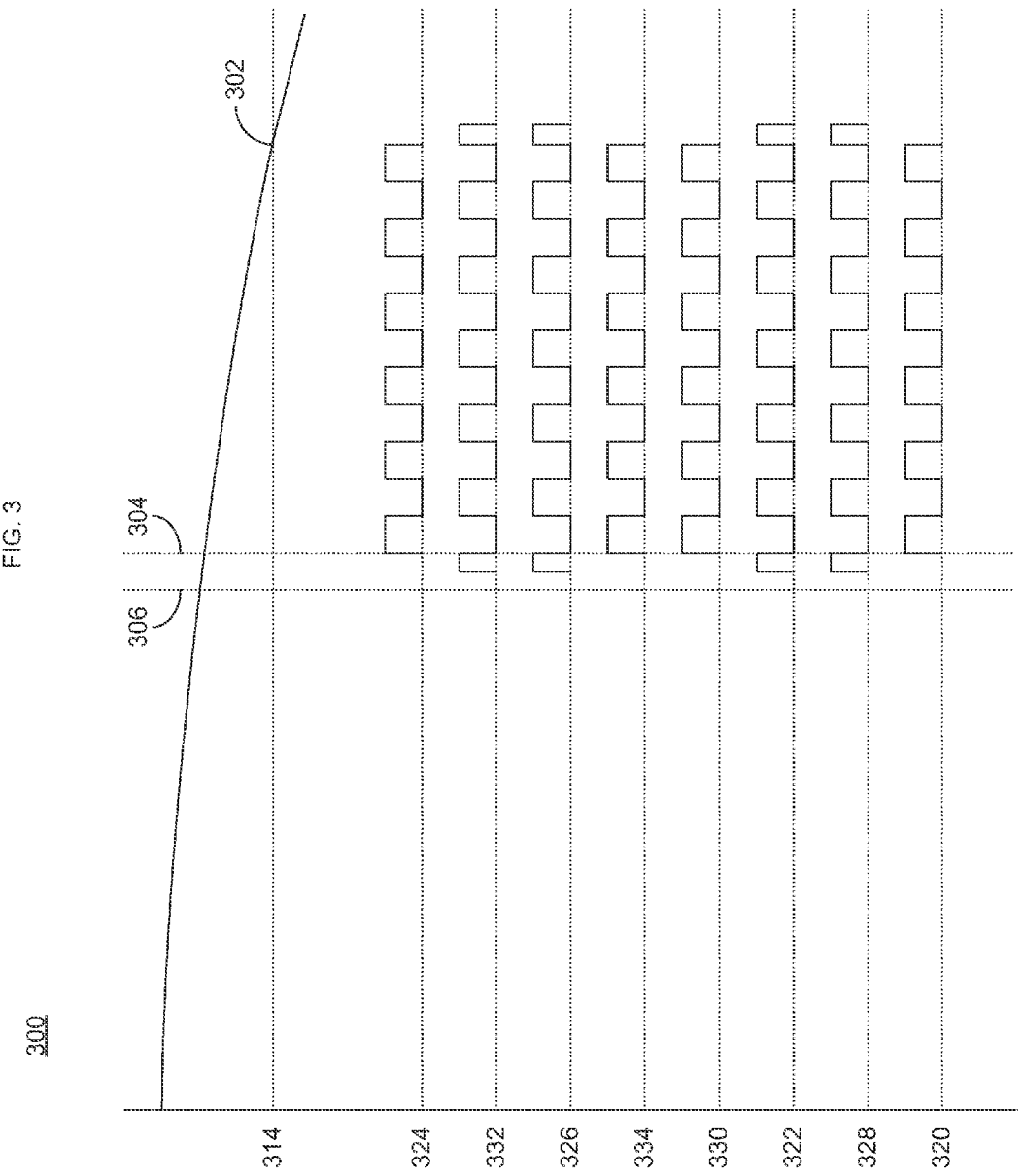
FIG. 3 illustrates exemplary control signals which may be utilized during the first phase for initiating an electrical system, in accordance with one embodiment.

FIG. 3 illustrates a timing diagram 300 for an exemplary cycle during an initial start-up phase. It should be noted that FIG. 3 is not drawn to scale. As seen in FIG. 3, a signal 314, corresponding to voltage of the AC interface 114, has a zero crossing at a time 302. As discussed above, the control module determines a start time 304, prior to the zero crossing time 302, at which point the control module 116 initiates PWM signals 320-334, corresponding to switches 20-34, respectively. Subsequent cycles of the initial start-up phase would have start-up times earlier than previous cycles, assuming that the current 190 flowing through inductor 110 didn't exceed the predetermined threshold, as discussed above. For example, a subsequent start time could be at time period 306.

Figure 4:
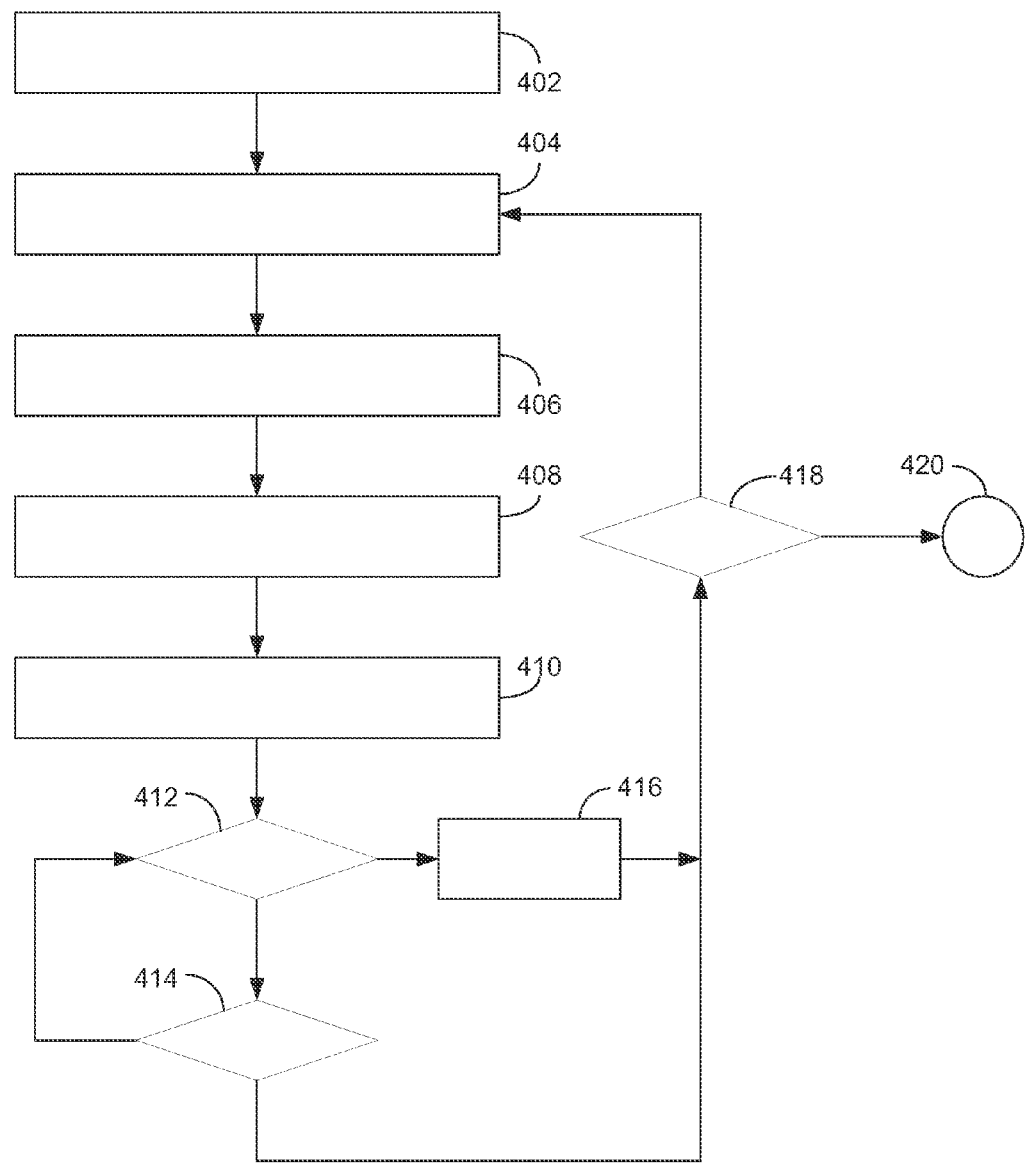
FIG. 4 is a flow diagram illustrating a secondary phase for initiating an electrical system, in accordance with one embodiment.

FIG. 4 is a flow diagram 400 for an exemplary secondary start-up phase for the electrical system 100 illustrated in FIG. 1. In the secondary start-up phase the control module 116 charges the capacitor and/or DC voltage source 118 to the peak AC voltage from the AC voltage interface 114. This secondary start-up phase may be optional, depending upon the voltage across the capacitor after the first start-up phase. As discussed above, the counter in the first start-up phase can be selected to raise the charge on the capacitor and/or DC voltage source 118 to the peak AC voltage from the AC voltage interface 114.

The control module 116 first waits for an AC line voltage zero-crossing. (Step 402). The control module then computes the next zero-crossing and stores the time as the next PWM-off event in the same manner as discussed relative to the initial start-up phase. (Step 404).

The control module 116 then computes a start time for the PWM signal to start the PWM signals prior to the next calculated zero crossing and a control voltage. (Step 406). In contrast to the initial start-up phase where the start time was based upon a counter, in the secondary start-up phase the start time is based upon an output voltage. The output voltage may be, for example, the voltage of the capacitor 126 and/or the voltage of the DC voltage source 118. In one embodiment, for example, the control module 116 measures the voltage across the DC voltage source 118. The control module then determines the control voltage by adding a predetermined constant to the measured voltage across the DC voltage source 118. In one embodiment, for example, the predetermined constant may be in the range of two to six volts; however, the predetermined constant could vary outside the two to six volt range based upon the configuration of the electrical system 100 and how quickly the electrical system can safely be ramped up to the peak voltage with zero percent duty cycle. Further, in other embodiments the amount of voltage added to the control voltage through each cycle of the secondary phase may vary based upon the measured output voltage. Further yet, in other embodiments the amount of voltage added to the control voltage can be adjusted based upon a computed voltage drop across the semiconductor devices of the electrical system 100 (e.g., switches 20-34).

The control module then waits for the calculated PWM start time. (Step 408). Once the calculated PWM start time has been reached, the control module 116 starts issuing the PWM signals to control switches 20-34 such that a voltage is transferred to the capacitor 126 and/or DC voltage source 118 with a zero percent duty cycle. As discussed above, the switches 20-34 can be controlled by the control module 116 to provide a voltage to the capacitor 126 and/or DC voltage source 118 which is greater than the peak voltage AC interface 114 (i.e., providing boost). However, in the secondary start-up cycle a zero percent duty cycle is used, providing no boost. While other configurations may be used, one benefit of the configuration of the electrical system illustrated in FIG. 1 is that even when the control module 116 configures the second energy conversion module 108 to have a zero percent duty cycle, voltage is still transferred across the isolation module 106, allowing the control module 116 to provide voltage to the capacitor 126 and/or DC voltage source 118.

After the control module 116 has begun to issue the corresponding PWM signals, the control module monitors the amount of current 190 through the inductor 110. (Step 412). If the current 190 is above a predetermined threshold at which damage could occur to the electrical system 100, the control module reduces the control voltage for a subsequent cycle of the secondary start-up phase. (Step 416).

If the current 190 through inductor 110 is not above the predetermined threshold, the control module determines whether the PWM off time has been reached. (Step 414). As discussed above, the PWM off time may be at the zero-crossing of the AC interface 114. In other embodiments, the PWM off time, for example, could be shortly before or after the zero-crossing. If the PWM off time has not been reached, the control module 116 returns to Step 412 and continues to monitor the current 190 through inductor 110. If the PWM off time has been reached, the control module measures the output voltage (i.e., the voltage across the capacitor 126 and/or DC voltage source 118). (Step 418). If the output voltage is greater than or equal to the peak AC voltage of the AC interface 114, the control module proceeds to a third phase of the start-up procedure. (Step 420). If the output voltage is less than the peak AC voltage of the AC interface 114, the control module returns to Step 402 and returns to Step 404 to compute the subsequent zero-crossing as discussed above.

Figure 5:
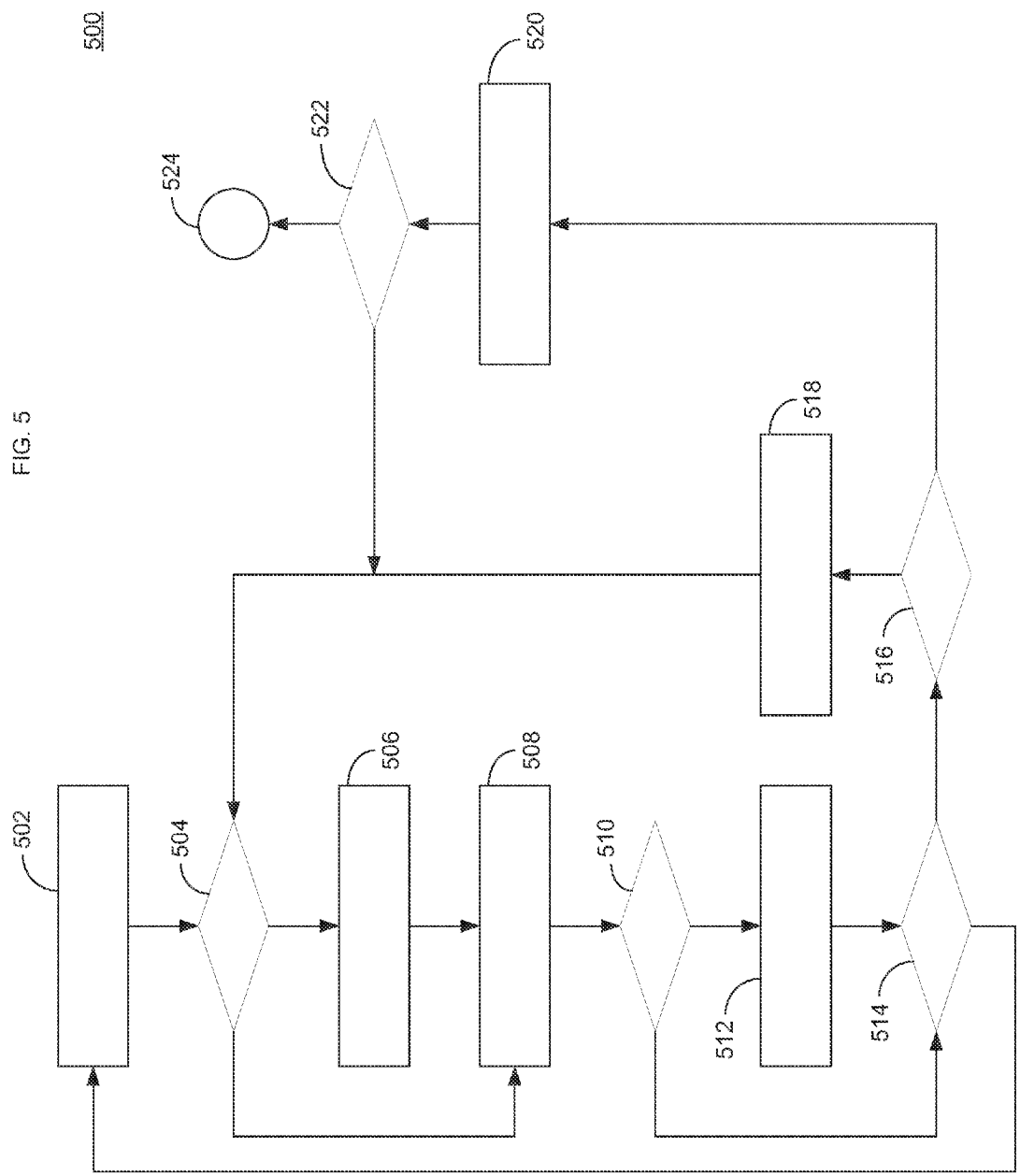
FIG. 5 is a flow diagram illustrating a tertiary phase for initiating an electrical system, in accordance with one embodiment.

FIG. 5 is a flow diagram 500 for an exemplary tertiary start-up phase for the electrical system 100 illustrated in FIG. 1. In contrast to the initial and secondary phases where the control module 116 only generated the PWM signals during a portion of the cycle, in the tertiary phase the PWM signals are generated continuously. As discussed above, for the initial start-up phase and secondary start-up phase, the control module 116 generated PWM signals to control switches 20-34 such that there was a zero-percent duty cycle. In the tertiary phase the control module ramps up the duty cycle from zero percent to a maximum value, providing a boost function by creating voltage spikes, as discussed in further detail below.

The duty cycle correlates to a proportion of a PWM cycle when current is flowing through the inductor 110. If, for example, the control module 116 clamps the duty cycle to 10%, the control module 116 controls switches 20-34 to allow current to flow through the inductor 116 for 10% of the AC half cycle, storing energy in the inductor. When the control module 116 interrupts the current path from the AC interface 114, by opening some of switches 20-34, the inductor releases the stored energy providing a boost (i.e., increasing the voltage of the energy transferred to the capacitor 126 and/or DC energy source 118).

In the embodiment illustrated in FIG. 1, the input voltage source is AC energy source 120 attached at AC interface 114. Because the AC energy source 120 voltage modulates along a sine wave the amount of boost, which is also proportional to the duty cycle, varies depending upon a phase angle of the AC energy source 120. The boost needed to produce a given output voltage is inversely proportional to the instantaneous AC voltage. In other words, at the zero crossing of the AC energy source 120, the needed boost is infinite, while at the peak of the AC half cycle the needed boost is at a relative minimum.

The control module 116 first computes the PWM duty cycle needed to maintain the output voltage reached in the secondary phase. (Step 502). For the first pass through the tertiary start-up phase, the initial duty cycle may be, for example, zero-percent. The control module 116 then compares the computed duty cycle to a maximum duty cycle clamp value. (Step 504). The maximum duty cycle clamp value corresponds to the maximum duty cycle the control module 116 would allow for the present AC half cycle. For the first pass through the tertiary start-up phase, the maximum clamp value may be set to, for example, zero percent. In other embodiments, the initial maximum clamp value may be set to a nominal amount, for example, two percent. The maximum clamp value is adjusted upwards after each half AC cycle where there was no over-current, as discussed in further detail below. During this duty cycle clamp escalation period, a single duty cycle is computed and used until the clamp has been raised to its end value. This duty cycle is an estimate, based on known system parameters, designed to boost the capacitor voltage to its target value.

If the computed PWM duty cycle (from Step 502) is greater than the maximum duty cycle clamp value the control module 116 clamps the PWM duty cycle to the clamp value (Step 506). The energy stored in the inductor 110 is proportional to the duty cycle. That energy is released in each PWM cycle. Whether the current flows out the inductor 110 to the capacitor 126 and/or the DC energy source 118 depends on the voltage across the capacitor 126 and/or the DC energy source 118.

The control module 116 then continues to generate PWM signals based upon the computed PWM duty cycle and whether the computed PWM duty cycle is greater than the maximum duty cycle clamp value for the current AC half cycle. (Step 508). If the computed PWM duty cycle is greater than the maximum duty cycle clamp value for the current AC half cycle, the control module 116 generates PWM signals to maintain the current duty cycle. If the computed PWM duty cycle is less than the maximum duty cycle clamp value for the current AC half cycle, the control module 116 generates PWM signals to increase the current duty cycle. In other words, the control module 116 calculates a duty cycle that will produce something close to the desired output voltage. That duty cycle is used during the entirety of the tertiary start-up phase. After computing the duty cycle, the controller computes the ending clamp value, for example, a currently duty cycle plus five percent. If, for example, the calculated duty cycle is ten percent, the ending clamp value would be fifteen percent. The control module 116 would start ramping the clamp up from zero. Since the duty cycle cannot be larger than the clamp, the duty cycle will follow the clamp up to ten percent. As the clamp continues to increase, the duty cycle will remain at ten percent, which should produce an output voltage somewhere around the desired output voltage.

The control module 116 then monitors then amount of current flowing in the electrical system 100. (Step 510). If the amount of current is above a predetermined threshold, the control module 116 sets an over-current flag. (Step 512).

The control module 116 then determines if the AC half cycle is complete. (Step 514). In other words, the control module monitors to see if a zero-crossing has occurred on the AC interface 114. If the zero-crossing has not occurred, the control module returns to Step 502 to compute the PWM duty cycle needed to maintain the output voltage measured across the capacitor 126 and/or DC voltage source 118.

If a zero-crossing has occurred, the control module 116 determines if an over-current flag was set during the AC half cycle. (Step 516). If an over-current flag was set during the AC half cycle, the control module clears the over-current flag and returns to Step 504.

If an over-current flag was not set during the last AC half cycle, the control module 116 increases the maximum duty cycle clamp value. (Step 520). In one embodiment, for example, the maximum duty cycle clamp value is increased by a predetermined amount for each AC half cycle where no over-current flag was set. For example, in one embodiment the maximum duty cycle clamp value is increased 0.5% for each AC half cycle where no over-current flag was set. The amount that the maximum duty cycle clamp value is increased can vary depending upon the configuration of the electrical system 100 and how quickly the duty cycle can be increased without risking damage to the electrical system 100.

The control module then determine if the maximum duty cycle clamp value is greater than or equal to a maximum desired duty cycle. (Step 522). In one embodiment, for example, the maximum desired duty cycle is ninety-four percent. However, the maximum desired duty cycle can vary depending upon the configuration of the electrical system. For example, in other embodiments the maximum desired duty cycle may range from ninety to ninety-five percent. The duty cycle requires some off time to generate the flyback voltage which boosts the output of the electrical system 100. If the maximum duty cycle clamp value is less than the maximum desired duty cycle, the process returns to Step 502. If the maximum duty cycle clamp value is greater than or equal to the maximum desired duty cycle, the start-up is complete and the electrical system begins normal operation. (Step 524). In another embodiment, the control module 116 may set the maximum desired duty cycle for the third phase at a lower value than an overall maximum duty cycle. In this embodiment, the control module 116 can be configured to ramp the duty cycle up to the overall maximum value during normal operation.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for initiating a charging system having an energy conversion module configured to provide a boost function based upon a duty cycle, comprising:
   providing, by the charging system, an incrementally increasing voltage to a battery up to a first predetermined threshold while the energy conversion module has a zero-percent duty cycle;
   providing, by the charging system, an incrementally increasing voltage to the battery from an initial voltage level of the battery up to a peak voltage of a voltage source while the energy conversion module has a zero-percent duty cycle; and
   providing, by the charging system, an incrementally increasing voltage to the battery by incrementally increasing the duty cycle of the energy conversion module.

2. The method of claim 1, wherein the voltage source is an alternating current (AC) voltage source and the method further comprises incrementally increasing the voltage provided to the battery every half cycle of the AC voltage source.

3. The method of claim 2, further comprising providing the incrementally increasing voltage to the battery every half cycle of the AC voltage source when a current flowing through the charging system is below a predetermined threshold.

4. The method of claim 3, wherein the providing, by the charging system, an incrementally increasing voltage to a battery up to a first predetermined threshold while the energy conversion module has a zero-percent duty cycle further comprises:
   calculating, by the charging system, a time of a next zero crossing event corresponding to a zero crossing of the AC voltage source;
   calculating, by the charging system, a start time relative to the time of a next zero crossing and based upon a incrementally increasing control voltage; and
   generating pulse width modulated control signals from the calculated start time to approximately the time of the next zero crossing.

5. The method of claim 3, wherein the providing, by the charging system, an incrementally increasing voltage to the battery from an initial voltage level of the battery up to a peak voltage of a voltage source while the energy conversion module has a zero-percent duty cycle further comprises:
   calculating, by the charging system, a time of a next zero crossing event corresponding to a zero crossing of the AC voltage source;
   calculating, by the charging system, a start time relative to the time of a next zero crossing to initiate a control signal and based upon a voltage measured across the battery; and
   generating pulse width modulated control signals from the calculated start time to approximately the time of the next zero crossing.

6. The method of claim 3, wherein the providing, by the charging system, an incrementally increasing voltage to the battery by incrementally increasing the duty cycle of the energy conversion module further comprises:

generating pulse width modulated control signals continuously throughout each half cycle of the AC voltage source, wherein the generated pulse width modulated control signals control a duty cycle of the energy conversion module.

7. A charging system, comprising:
a first interface configured to receive a voltage source;
an energy conversion module electrically connected to the interface; and
a controller communicatively connected to the energy conversion module, wherein the controller is configured to control the energy conversion module to:
provide an incrementally increasing voltage to a battery up to a first predetermined threshold while the energy conversion module has a zero-percent duty cycle;
provide an incrementally increasing voltage to the battery from an initial voltage level of the battery up to a peak voltage of a voltage source while the energy conversion module has a zero-percent duty cycle; and
provide an incrementally increasing voltage to the battery by incrementally increasing the duty cycle of the energy conversion module.

8. The charging system of claim 7, wherein the voltage source is an alternating current (AC) voltage source and the controller is further configured to control the energy conversion module to incrementally increase the voltage provided to the battery every half cycle of the AC voltage source.

9. The charging system of claim 8, wherein the controller is further configured to control the energy conversion module to incrementally increasing voltage to the battery every half cycle of the AC voltage source when a current flowing through the charging system is below a predetermined threshold.

10. The charging system of claim 9, wherein the controller, when controlling the energy conversion module to provide the incrementally increasing voltage to a battery up to the first predetermined threshold while the energy conversion module has a zero-percent duty cycle, is further configured to:
calculate a time of a next zero crossing event corresponding to a zero crossing of the AC voltage source;
calculate a start time relative to the time of a next zero crossing and based upon a incrementally increasing control voltage; and
generate pulse width modulated control signals from the calculated start time to approximately the time of the next zero crossing to cause the energy conversion module to transfer a voltage to the battery.

11. The charging system of claim 9, wherein the controller, when controlling the energy conversion module to provide an incrementally increasing voltage to the battery from an initial voltage level of the battery up to a peak voltage of a voltage source while the energy conversion module has a zero-percent duty cycle, is further configured to:
calculate a time of a next zero crossing event corresponding to a zero crossing of the AC voltage source;
calculate a start time relative to the time of a next zero crossing to initiate a control signal and based upon a voltage measured across the battery; and
generate pulse width modulated control signals from the calculated start time to approximately the time of the next zero crossing to cause the energy conversion module to transfer a voltage to the battery.

12. The charging system of claim 9, wherein the controller, when controlling the energy conversion module to provide an incrementally increasing voltage to the battery by incrementally increasing the duty cycle of the energy conversion module, is further configured to:
generate pulse width modulated control signals continuously throughout each half cycle of the AC voltage source to cause the energy conversion module to transfer a voltage to the battery,
wherein the generated pulse width modulated control signals control a duty cycle of the energy conversion module.

13. A method for initiating a charging system having an energy conversion module electrically connected to an alternating current (AC) interface, comprising:
synchronizing, by a control module, the charging system to an AC voltage source connected to the AC interface;
determining, by the control module, a next zero crossing of the AC voltage source;
calculating, by the control module, a start time for each half cycle of the AC source to initiate a pulse width modulated (PWM) control signal, the control signal configured to cause the energy conversion module to transfer a voltage to a battery; and
generating, by the control module, the PWM control signal from the start time to an approximate end of a half cycle of the AC voltage source.

14. The method of claim 13, wherein the calculating further comprises:
calculating a control voltage based upon a counter and a first predetermined voltage increment; and
determining the start time based upon when the AC voltage source is approximately equal to the control voltage and decreasing from a relative peak voltage for the respective half cycle of the AC source.

15. The method of claim 14, wherein after the control voltage is greater than or equal to a predetermined threshold, the method further comprises:
measuring, by the control module, a voltage across the battery;
calculating, by the control module, a start time for each half cycle of the AC source based upon the voltage measured across the battery and a second predetermined voltage increment; and
generating, by the control module, the PWM control signal from the start time to an approximate end of each half cycle of the AC voltage source.

16. The method of claim 15, wherein the start time is modified based upon a voltage drop through electrical components of the charging system.

17. The method of claim 15, wherein after the voltage measured across the battery is greater than or equal to a peak voltage of the AC voltage source, the method further comprises:
generating, by the control module, continuous PWM control signal throughout each half cycle of the AC voltage source,
wherein a duty cycle of the PWM control signals is incrementally increased from an initial value to a maximum duty cycle for each half cycle of the AC voltage source.

18. The method of claim 17, wherein the duty cycle of the PWM control signals is incrementally increased from the initial value to the maximum duty cycle for each half cycle of the AC voltage source when a current flowing through the charging system is below a predetermined threshold.

19. The method of claim 13, wherein the zero crossing is a voltage zero crossing of the AC voltage source.

20. The method of claim 13, wherein the zero crossing is a current zero crossing of the AC voltage source.

* * * * *